United States Patent
Iline et al.

(10) Patent No.: US 7,171,412 B2
(45) Date of Patent: Jan. 30, 2007

(54) RESTRICTED ACCESS MODEL FOR HIERARCHICAL DATA STRUCTURES

(75) Inventors: Alexandre S. Iline, Mountain View, CA (US); Viktor V. Lapitski, Palo Alto, CA (US); Anatoli Fomenko, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 480 days.

(21) Appl. No.: 10/266,820

(22) Filed: Oct. 7, 2002

(65) Prior Publication Data

US 2004/0068491 A1    Apr. 8, 2004

(51) Int. Cl.
*G06F 7/00* (2006.01)
*H04L 9/00* (2006.01)

(52) U.S. Cl. .................... 707/9; 707/10; 707/100; 713/161; 713/155; 713/164; 717/114; 717/118

(58) Field of Classification Search ............. 707/3, 707/10, 100–104.1, 9; 717/114–118; 713/161, 713/155
See application file for complete search history.

(56) References Cited

U.S. PATENT DOCUMENTS

| | | | |
|---|---|---|---|
| 5,752,016 A * | 5/1998 | Whittaker et al. ............. 707/3 |
| 5,826,077 A * | 10/1998 | Blakeley et al. ............... 707/4 |
| 6,243,859 B1 * | 6/2001 | Chen-Kuang ................ 717/111 |
| 6,298,354 B1 * | 10/2001 | Saulpaugh et al. ...... 707/103 R |
| 6,385,722 B1 * | 5/2002 | Connelly et al. .............. 713/2 |
| 6,487,713 B1 * | 11/2002 | Cohen et al. ................ 717/105 |
| 6,502,102 B1 * | 12/2002 | Haswell et al. ............. 707/102 |
| 6,701,514 B1 * | 3/2004 | Haswell et al. ............. 717/115 |
| 6,804,686 B1 * | 10/2004 | Stone et al. .............. 707/104.1 |
| 6,807,548 B1 * | 10/2004 | Kemper .................. 707/103 R |
| 2002/0095659 A1 * | 7/2002 | Jacobs et al. ................ 717/118 |
| 2003/0229883 A1 * | 12/2003 | Savov et al. ................. 717/100 |
| 2004/0006550 A1 * | 1/2004 | Upton ............................ 707/1 |
| 2004/0034642 A1 * | 2/2004 | Szilagyi et al. ............. 707/100 |
| 2004/0103405 A1 * | 5/2004 | Vargas ........................ 717/137 |

OTHER PUBLICATIONS

Green, Marcus; "*Java2 Certification Tutorial: 4) Language Fundamentals*"; Nov. 12, 2000; pp. 2-9; http://www.jchq.net/tutorial/04_01Tut.htm.

* cited by examiner

*Primary Examiner*—Jean M. Corrielus
*Assistant Examiner*—Anh Ly
(74) *Attorney, Agent, or Firm*—Osha Liang LLP

(57) ABSTRACT

A method for protecting data of a hierarchical operation includes obtaining a restricted access model data structure representing the hierarchical operation, wherein the restricted access model data structure comprises a first writer node and a second writer node, preventing the second writer node from writing data to a first data store, and preventing the first writer node from writing data to a second data store.

16 Claims, 6 Drawing Sheets

RESTRICTED ACCESS MODEL FOR HIERARCHICAL DATA STRUCTURES

BACKGROUND ART

Computer software programs, both object-oriented and non-object-oriented in nature, often accomplish tasks or operations that can be represented hierarchically, i.e., may be represented using a tree structure, with a root node, and descending levels of parent nodes and child nodes, with leaf nodes at the end of a particular branch of the tree structure. Individual nodes of a tree structure may represent individual steps or operations. For example, a computer software program may perform a series of related operations, where a root operation has one or more sub-operations (i.e., child operations), and each child operation may itself have one or more child operations.

FIG. 1 shows a tree structure (10) representing a hierarchical operation, where the tree structure (10) has a root operation (11) and a parent operation (12). The parent operation (12) has two child operations, child operation 1 (14) and child operation 2 (16). Each operation (the root operation (11), the parent operation (12), the child operation 1 (14), and the child operation 2 (16)) may be associated with data gathered or used by the software program, program parameters, commands, instructions, or other information. Often, data is gathered by a particular operation of the software program and is used by child operations. For example, the parent operation (12) may represent a step of a testing procedure that gathers and stores testing data. Child operation 1 (14) and child operation 2 (16) may represent subordinate operations of the testing procedure, which require access to stored data relating to the parent operation (12).

As shown in FIG. 2, another example of a hierarchical operation represented by a tree structure is a management system for a chain of bookstores. For the purpose of this example, the chain of bookstores uses a computer software program to manage aspects of the operations of each bookstore in the chain. A tree structure (30) includes a root node, such as a bookstore operations node (32). The bookstore operations node (32) has two child nodes that represent child operations: bookstore location 1 transactions (34) and bookstore location 2 transactions (36), which represent book purchase transactions at two different bookstore locations.

The operations for bookstore location 1 transactions (34) and bookstore location 2 transactions (36) each has child operations. In fact, bookstore location 1 transactions (34) has two child operations, order 1-1 *Anna Karenina* (38) (representing a customer purchase of the book *Anna Karenina*), and order 1-2 *Doctor Zhivago* (40). Additionally, bookstore location 2 transactions (36) has three child nodes, order 2-1 *Crime and Punishment* (42), order 2-2 *War and Peace* (44), and order 2-3 *Crime and Punishment* (46) (*Crime and Punishment* was purchased in two separate transactions).

Those skilled in the art will appreciate that the tree structure (30) may encompass other operations than as depicted in FIG. 2. For example, a particular operation representing a book purchase may also have associated child operations representing information or data of interest, such as a purchase total or time of purchase data, etc.

Data associated with the operations of the bookstores may be accessed and displayed for various purposes. For example, a marketing executive may direct a programmer to gather data for the purpose of generating web site sales charts which track total sales per day per bookstore, and the programmer may then write a software program to gather book purchase data from each node representing a book purchase. Next, the programmer determines relationships between individual data elements (e.g., a first data element corresponds to a first book purchase, and a second data element corresponds to a second book purchase). After determining relationships between individual data elements, the programmer may then format data appropriately with a document presentation standard (e.g., mark each data with markup language tags, such as Hypertext Markup Language (HTML) tags, Extensible Markup Language (XML) tags, Postscript tags, etc.) for display on the web site. A web server may then serve up formatted data to a browser. During then execution of a program (e.g., data gathering), several issues of concern may arise, such as avoiding corruption of raw data by overwriting, and access and security of the raw and formatted data elements.

A common concern when designing software programs that involve hierarchical operations, such as the software program associated with the tree structure (30), is the issue of data security. For example, if the software program is used as a library by client code, concerns may exist that data may be corrupted or manipulated by improper code or the use of an unstable network connection. Examples of inappropriate use include using client code to improperly or maliciously access data associated with hierarchical operations. The client code may improperly overwrite data associated with order 1-1 *Anna Karenina* (38) when storing data associated with order 2-1 *Crime and Punishment* (42). Alternatively, credit card data associated with the order may be maliciously obtained. In addition, client code may improperly override methods of the program. In order to prevent such inappropriate use, a variety of programming techniques and/or constructs may be used in designing the program in order to enhance the robustness and security of the program.

One method to protect data, attributes, and methods of object-oriented software programs is to use access modifiers. An example of an access modifier is the declaration of method or an attribute of a particular class as "private" or "public." A private method or attribute allows only objects instantiated from the particular class to invoke the method or access the attribute labeled "private." In contrast, the public method or attribute allows objects of all classes to interact with the method or attribute labeled "public."

Access modifiers may also be used while declaring classes, and especially useful when declaring inner classes. An inner class is a class declared within another class, as shown in Java™ source code below (ellipses (" . . . ") indicate source code not shown):

```
public class outerClass {
    private outerClassData;
    private class innerClass {
        private privateMethod ( ) {...}
        ...
    }
    ...
}
```

Referring to the segment of source code, methods declared as the private inner class innerClass are able to access the data of the outerClass class, even if declared "private." Also, private methods and data of an inner class are accessible from code of an outer class containing the inner class. For example, code in a method of the outerClass class can access the private method privateMethod( ) of the inner class innerClass.

SUMMARY OF INVENTION

In general, in one aspect, the invention relates to a method for protecting data of a hierarchical operation. The method comprises obtaining a restricted access model data structure representing the hierarchical operation, wherein the restricted access model data structure comprises a first writer node and a second writer node, preventing the second writer node from writing data to a first data store, and preventing the first writer node from writing data to a second data store.

In general, in one aspect, the invention relates to a method for protecting data of a hierarchical operation. The method comprises obtaining a restricted access model data structure representing the hierarchical operation, wherein the restricted access model data structure comprises a first writer node and a second writer node, preventing the second writer node from writing data to a first data store, preventing the first writer node from writing data to a second data store, reading data from the first data store by a first reader node, reading data from the first data store by a second reader node by traversing the restricted access model data structure from the second reader node to a first reader node, writing data to the first data store using the first writer node, writing data to the second data store using the second writer node, generating a root reader node and a root writer node representing a root operation of the hierarchical operation, accessing the root reader node via a reader-to-root link, accessing a child reader node of the root reader node via a parent reader-to-child reader link, generating a plurality of raw data by reading data from the first data store, inferring a relationship between each of the plurality of raw data, formatting the plurality of raw data into formatted data using the relationship, and presenting the formatted data via a display device.

In general, in one aspect, the invention relates to a computer system for protecting data of a hierarchical operation. The computer system comprises a processor, a memory, a storage device, a display device, and software instructions stored in the memory for enabling the computer system under control of the processor, to perform obtaining a restricted access model data structure representing the hierarchical operation, wherein the restricted access model data structure comprises a first writer node and a second writer node, preventing the second writer node from writing data to a first data store, and preventing the first writer node from writing data to a second data store.

In general, in one aspect, the invention relates to a data display system for a hierarchical operation. The data display system comprises restricted access model data structure comprising a first reader node for accessing a plurality of raw data, a formatter configured to access the plurality of raw data and generate formatted data, and a display device presenting the formatted data.

In general, in one aspect, the invention relates to an apparatus for protecting data of a hierarchical operation. The apparatus comprises means for obtaining a restricted access model data structure representing the hierarchical operation, wherein the restricted access model data structure comprises a first writer node and a second writer node, means for preventing the second writer node from writing data to a first data store, and means for preventing the first writer node from writing data to a second data store.

Other aspects and advantages of the invention will be apparent from the following description and the appended claims.

DETAILED DESCRIPTION

Figure 1:
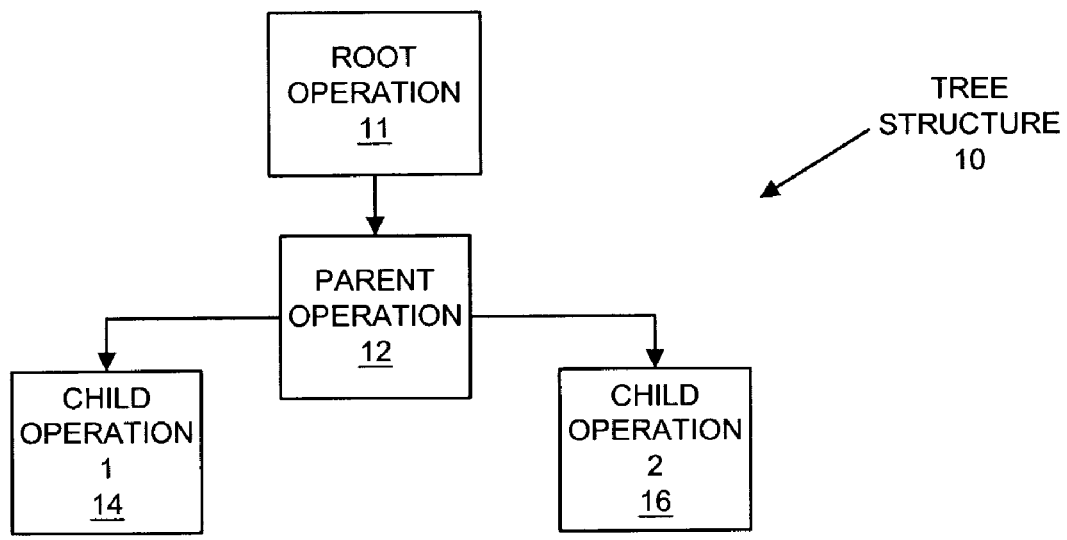
FIG. 1 illustrates a tree structure representing a hierarchical operation.

Specific embodiments of the invention will now be described in detail with reference to the accompanying figures. Like elements in the various figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 3:
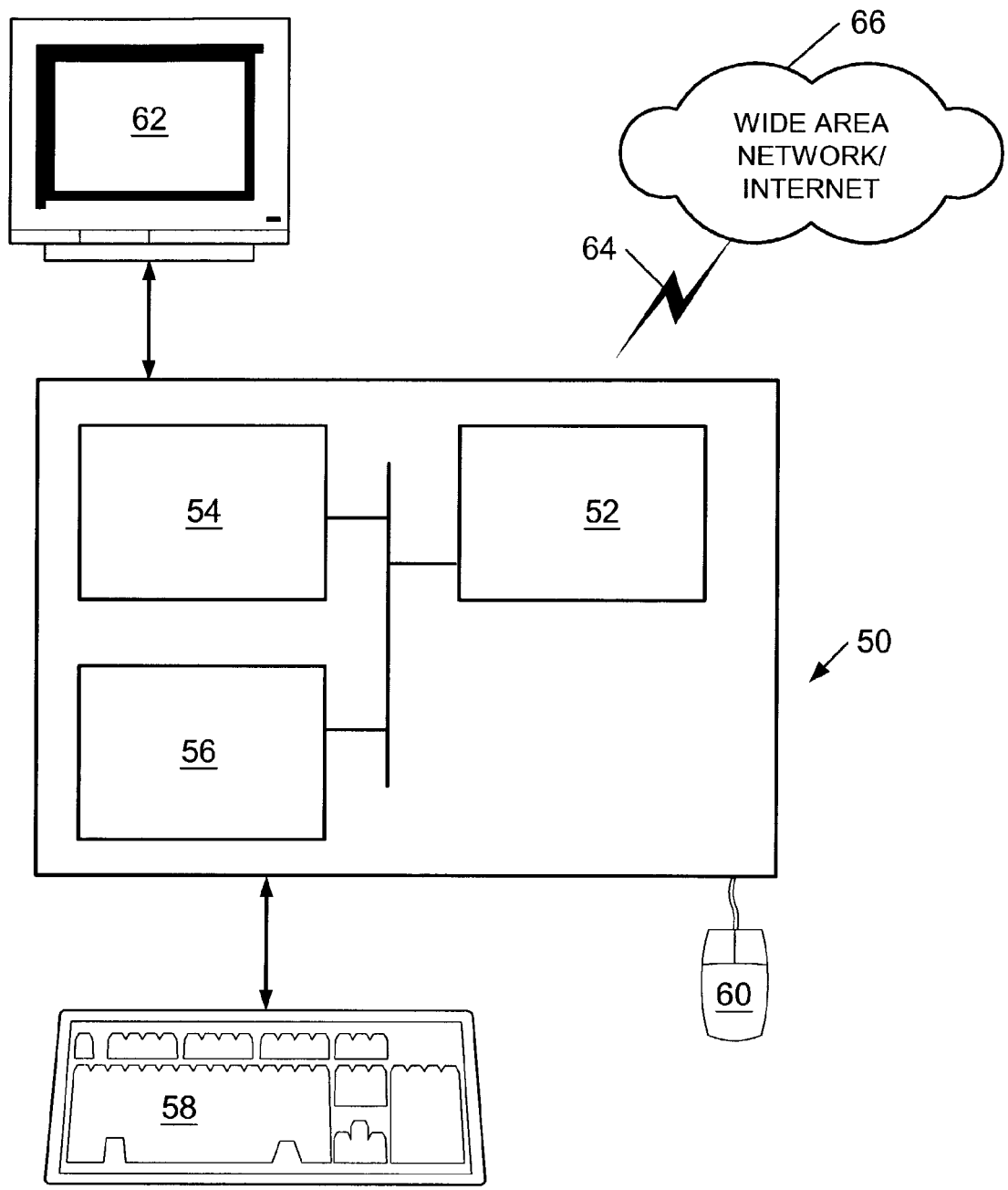
FIG. 3 illustrates a typical computer system.

The invention may be implemented on virtually any type computer regardless of the platform being used. For example, as shown in FIG. 3, a typical computer (50) includes a processor (52), memory (54), a storage device (56), and numerous other elements and functionalities typical of today's computers (not shown). The computer (50) may also include input means, such as a keyboard (58) and a mouse (60), and a display device, such as a monitor (62). Those skilled in the art will appreciate that these input and output means may take other forms in an accessible environment. The computer (50) may be connected via a network connection (64) to a Wide Area Network (WAN) (66), such as the Internet.

A computer software program implementing a hierarchical operation may require secure access to data between parts of the software program. For example, referring to the example shown in FIG. 2, a book purchase is made at one of the bookstores offering a discount on book purchases for repeat customers. In such a case, the software program requires access to data associated with other purchases (stored separately) in order to determine whether the customer identity is associated with other book purchases. In this case, accessing data associated with multiple hierarchical operations should be afforded protection to avoid improper or malicious access of data associated with the hierarchical operations.

Figure 4:
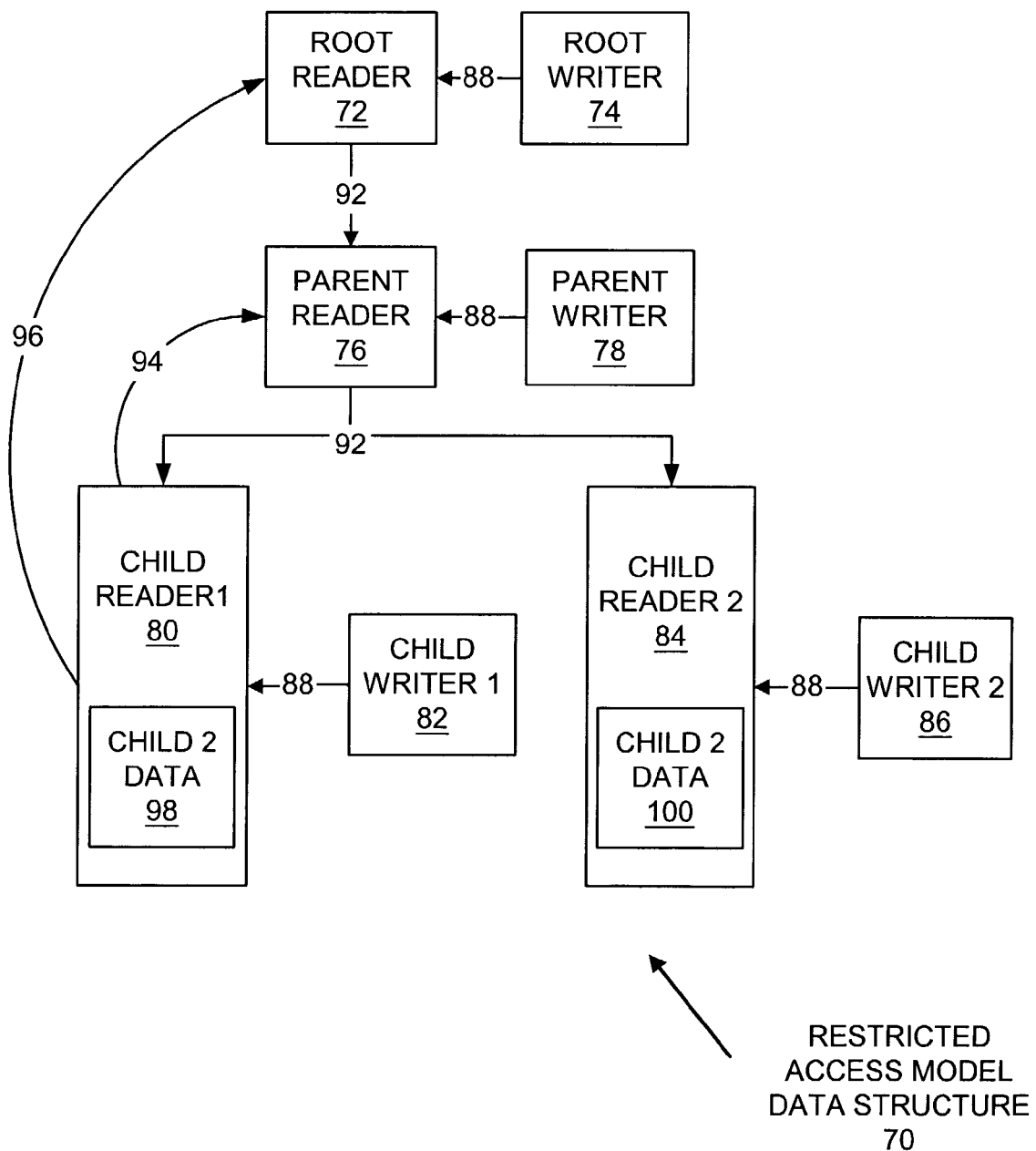
FIG. 4 illustrates a restricted access model data structure, in accordance with one or more embodiments of the invention.

In order to address issues, such as data security, with software programs that involve one or more hierarchical operations, a restricted access model data structure, such as is shown in FIG. 4, may be used. By creating the restricted access model data structure (70), protection of data is afforded because a particular node in the restricted access model data structure (70) is unable to record or corrupt data of its parent or sibling node.

In accordance with one or more embodiments of the invention, such a restricted access model data structure (70) includes a reader-writer pair (i.e., a reader node and a writer node) for each operation within a hierarchical tree structure of the hierarchical operation. As shown in FIG. 4, the reader-writer pair for a root operation of the hierarchical operation includes a root reader (72) and a root writer (74). The root operation may be decomposed into child operations, each of which is represented by a reader-writer pair, such as a parent reader (76) and a parent writer (78). The parent reader (76) and the parent writer (78) may be further decomposed into two sets of child read-writer pairs, namely a child reader 1 (80) and a child writer 1 (82), and a child reader 2 (84) and a child writer 2 (86).

Those skilled in the art will realize that designating an operation as a "parent" or "child" operation may vary while discussing the restricted access model data structure (70). The designation of an operation as "parent" or "child" is relative to the position of the node being discussed. For example, referring to FIG. 4, the parent reader (76) is a parent node with respect to the child reader 1 (80), while also a child node with respect to the root reader (72).

The reader node and the writer node, which are described as forming a reader-writer pair, each have separate functionality within the data structure (70). The writer node has the functionality to add children nodes and return reader nodes. The reader node returns children nodes, but does not have the ability to write data and no ability to add children nodes.

Figure 2:
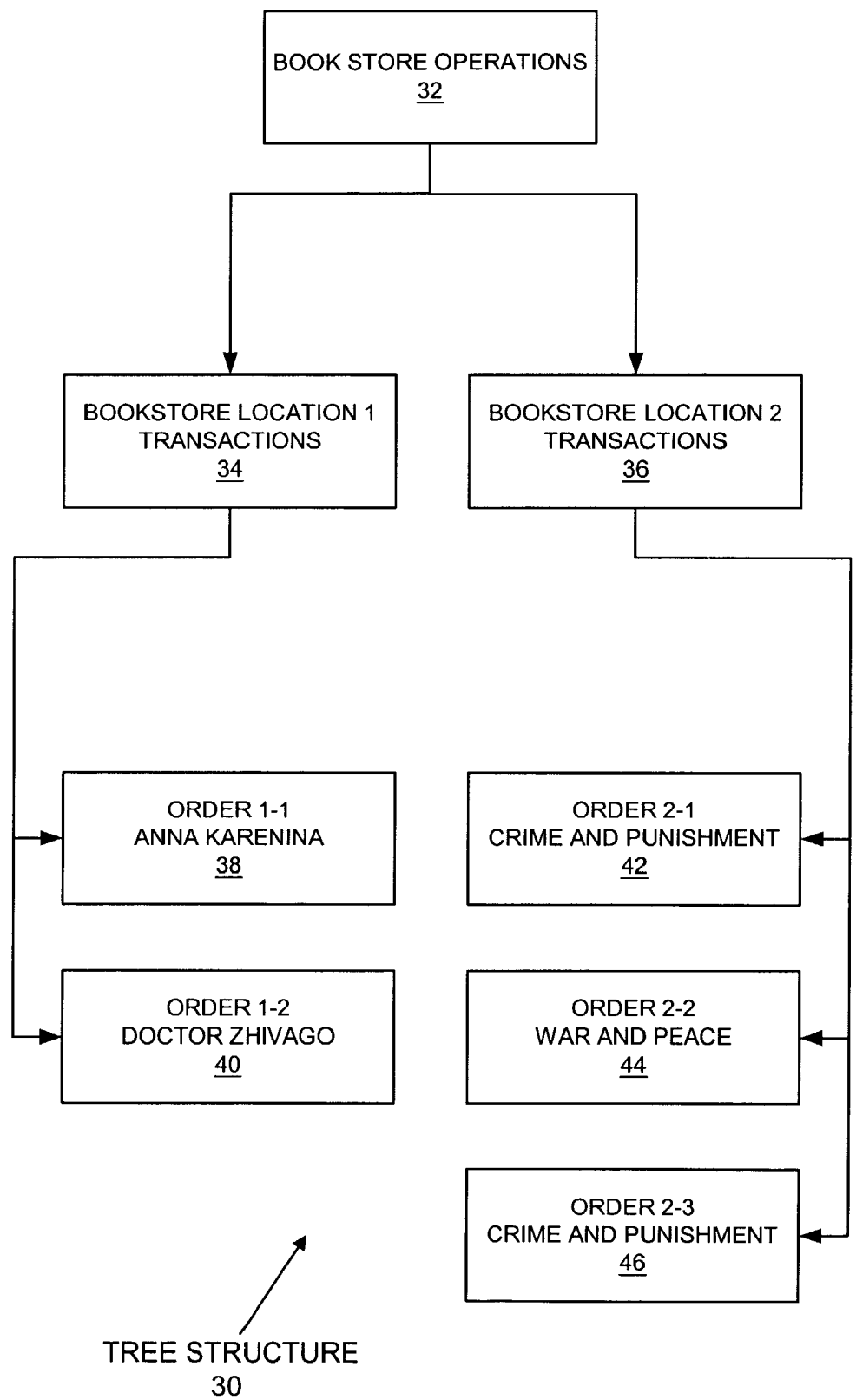
FIG. 2 illustrates a tree structure representing a hierarchical operation for a management system.

Using the bookstore example of FIG. 2, an example of a root operation is the bookstore operations node (32). The child reader-writer pair represents an operation of the hierarchical operation, such as a specific book order (e.g., order 1-2 (40)).

Referring back to FIG. 4, a one-way link (88) between each reader-writer pair ensures that a writer node of each reader-writer pair has access to a reader node of the reader-writer pair. However, note that the reader node of the reader-writer pair does not have access to the writer node of the reader-writer pair. For example, in accordance with one or more embodiments of the invention, the writer node may be an instantiated object of an object-oriented program with a reference or pointer to the reader node (also an instantiated object), whereas the reader node does not have a pointer or reference to the writer node.

Each parent reader node (any reader with one or more child reader nodes) has a parent reader-to-child reader link (92). Thus, using a software programming construct generally known in the art (e.g., an array or vector), the parent reader is able to access each child reader of the parent reader because each element of the array or vector stores a reference or pointer to a particular child reader.

Additionally, each child reader has a child reader-to-parent reader link (94) to a parent reader node of the child reader node. The child reader-to-parent reader link (94) may be implemented as a reference or pointer that is a property of an instantiated child reader object. For example, child reader 1 (80) may be instantiated as an object from a class which has a pointer or reference to a parent reader node, which is also an instantiated object. For the purpose of this discussion, FIG. 4 does not show a child reader-to-parent reader link for each reader node, although each reader node (except the root reader (72)) would usually have a child reader-to-parent reader link.

Additionally, each reader node of each reader-writer pair has a reader-to-root link (96) from each reader node to the root reader (72), with the exception of the root reader (72) itself. For the purpose of this discussion, FIG. 4 does not show each reader-to-root link (96) that may exist.

In one or more embodiments of the invention, data stored in connection with an operation (e.g., calculating sales tax for a book purchase, etc.) is stored in a data store (e.g., a vector or an array) where the data is accessible to a reader node associated with the operation. The data stored in connection with an operation may include items such as raw data, program instructions, method parameters, etc. As FIG. 4 shows, in one or more embodiments of the invention, the data may be stored within the reader node of the reader-writer pair as a data store, e.g., child 2 data (100) may be stored within child reader 2 (84). Alternatively, a child 1 data (98) may be accessible via a reader-to-data link (not shown).

The result of creating the restricted access model data structure (70) is protection of the data class in a private field by creating a reference to the data. Indirect access is provided to the referenced data, by providing restricted write access and full read access to the data. In one or more embodiments, data associated with a particular operation of a particular hierarchical operation may be stored by a reader node associated with the operation, while allowing reader nodes corresponding to other operations of the hierarchical operation to read the data. Each operation of the hierarchical operation may create child reader nodes and writer nodes that correspond to child operations.

Instantiation of writer nodes is controlled by a writer node inner class which has a private constructor, and instantiation of reader nodes is controlled by having a one-way link from each writer node to each reader node implemented by a private constructor for the reader node class and a writer node object having a reader node object as a private attribute. Therefore, the data associated with a particular operation is protected with respect to possible corruption of the data by writer nodes other than the particular writer node associated with the particular operation, while allowing read access to each data associated with any particular operation.

Figure 5:
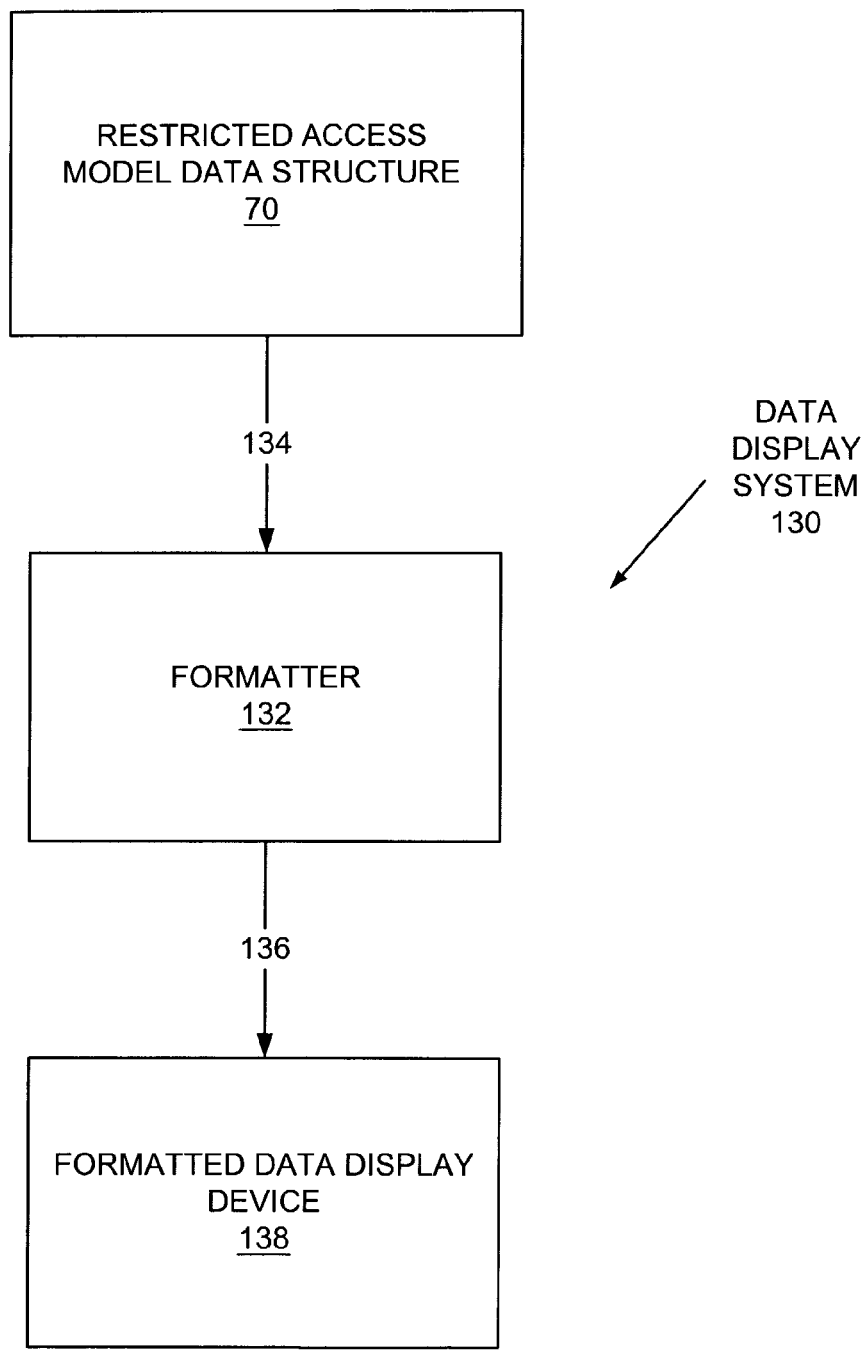
FIG. 5 illustrates a block diagram of a data display system, in accordance with one or more embodiments of the invention.

Data read from the restricted access model data structure may be formatted and presented for display. FIG. 5 shows a data display system (130) for formatting and displaying data. A formatter (132) has a raw data input (134) from the restricted access model data structure (70). For example, data may be read from child 2 data (100 in FIG. 4) via child reader 2 (84 in FIG. 4). In accordance with one or more embodiment of the invention, the formatter (132) determines relationships between raw data and formats the raw data according to accepted data standards and/or communications protocols, such as XML, HTML, Postscript, TeX, LaTeX, Standard Generalized Markup Language (SGML), etc. The formatter (132) is connected to a formatted data display device (134) via a formatted data output (136).

Relationships between individual reader nodes (i.e., parent-child, sibling, etc.) may be determined by the formatter (32) by, for example, inferring such relationships from traversing the restricted access mode data structure (70). Other means of inferring include using other aids, such as a set of rules, in combination with use of a data structure that models the restricted access model data structure (70). For example, client code may create a data structure comprising a set of linked arrays, where each cell of each array represents an operation of the hierarchical operation. Thus, the data structure models the restricted access model data structure (70).

Because relationships between data may be determined by the formatter (32), the formatter (32) may then format the data using the relationships. Thus, formatted data may be stored in data stores, or be accessible by, the restricted access model data structure (70) without corrupting the data or overwriting the data. For example, in one or more embodiments of the invention, writer nodes are instantiated from a private inner class which implements a writer interface. The writer interface does not have a method available to alter a data already stored in the restricted access model data structure (70).

Figure 6:
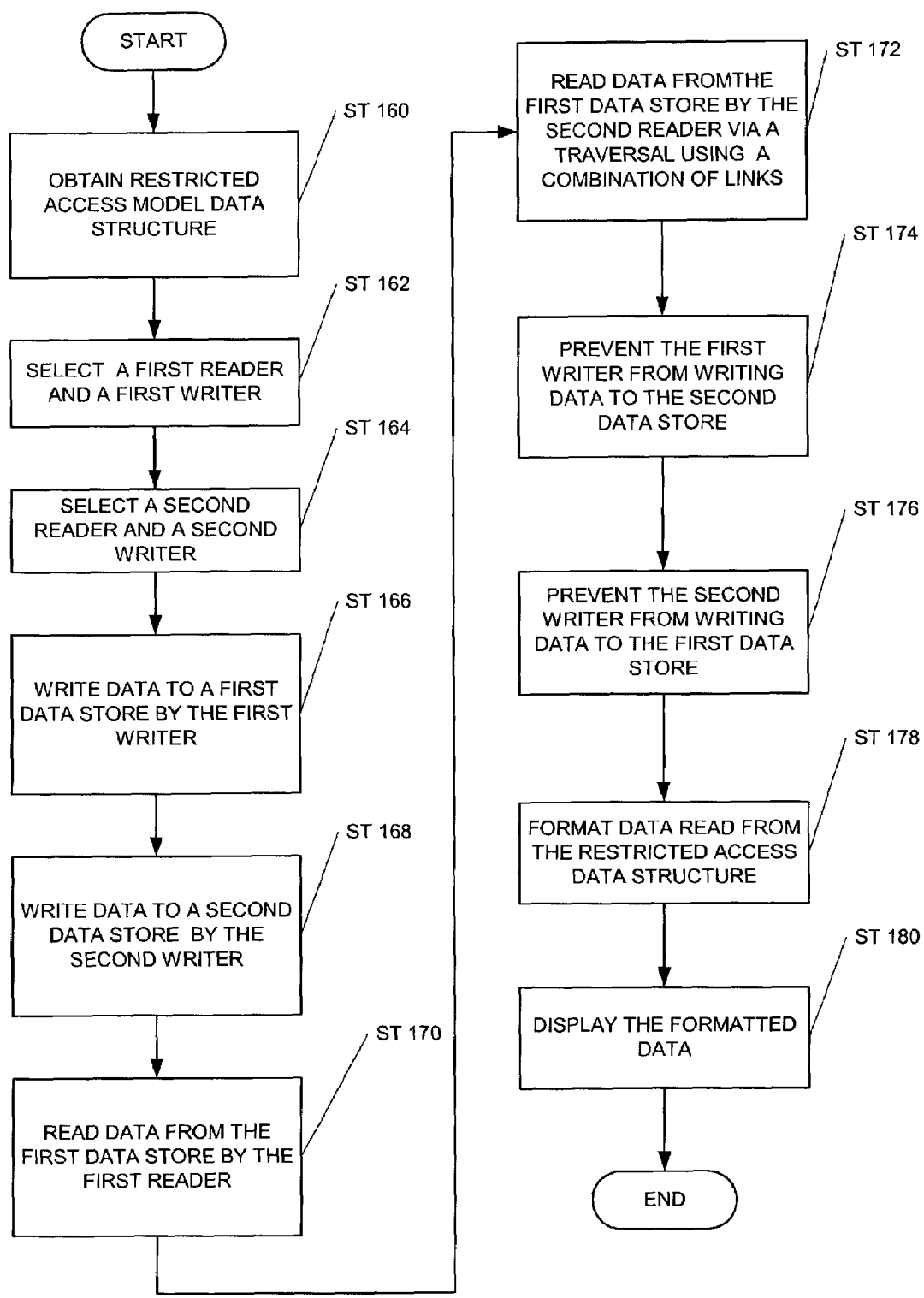
FIG. 6 illustrates a flow diagram for protecting data associated with hierarchical operations, in accordance with one or more embodiments of the invention.

FIG. 6 shows a flow diagram for accessing critical data while providing protection of data associated with a hierarchical operation. First, the restricted access model data structure is obtained (Step 160). In accordance with one or more embodiments of the invention, the restricted access model data structure may be obtained by instantiating a data structure object through one or more constructors. An initial constructor, in accordance with one or more embodiments of the invention, may receive one or more parameters, e.g., a multi-part data structure, such as a series of linked vectors or arrays, where a first element of the data structure (e.g., a first vector) is linked to a second element of the data structure (e.g., a second vector).

In accordance with one or more embodiments of the invention, the restricted access model data structure is constructed so as to provide for library functions, such as creating child reader nodes and child writer nodes that represent child operations for a particular operation of the hierarchical operation. Also, provided are library functions for reading data from a data store, traversing the restricted access model data structure, and adding new data to the data store, together with functionality for enabling each reader node of each operation to read data associated with other operations.

Shown below in Code Listing A is an example of source code in the Java™ programming language that may be used to generate the restricted access model data structure for an embodiment of the invention concerning conducting a test on a software program, where the test is characterized as a hierarchical operation, with a root operation that has multiple child operations.

Code Listing A

```
public interface TestResultReader {
    public TestDataElement  [ ]   getElements ( );
    public TestResultReader [ ]   getChildren ( );
    public TestResultReader   getParent ( );
    public TestResultReader   getRoot ( );
}
public interface TestResultWriter {
    public void add (TestDataElement  element);
    public TestResultWriter   createChild(String id);
    public TestResultReader   getReader ( );
}
public interface Test {
    public String getName ( );
    public void run (TestResultWriter data);
}
import java.util.Vector;
public class TestData {
    private DataReader root;
    public TestData ( ) {
        root = new DataReader (null,   "Root");
    }
    public TestResultWriter  getRootWriter ( ) {
        return (new DataWriter (root));
    }
```

Code Listing A -continued

```
public class DataReader implements TestResultReader {
    private Vector elements;
    private Vector readers;
    private String name;
    private DataReader parent;
    Private DataReader (DataReader parent, String name)
    {
    this.parent = parent;
    this.name = name;
    elements = new Vector ( );
    readers = new Vector ( );
    public String getName ( ) {
        return (name);
    }
    public TestResultReader  getRoot ( ) {
        return (root);
    }
    public TestResultReader  getParent ( ) {
        return (parent);
    }
    public TestResultReader  [ ]   get Children ( ) {
        DataReader [ ]   result = new
            DataReader [readers.size ( ) ];
        for (int i = 0;  i < result.length;  i++) {
            result [i] = (DataReader)  readers.get
                (i);
        }
        return (result);
    }
    public TestDataElement  [ ]   getElements ( ) {
        public TestDataElement  [ ]   result = new
        TestDataElement [elements.size ( )];
        for (int i = 0;  i < result.length;  i++) {
            result [i]  =   (TestDataElement)
                elements.get(i);
        }
        return (result);
    }
    private DataReader   createChild (String name) {
    DataReader result = new DataReader (this, name);
        synchronized (readers) {
            readers.add (result);
        }
    private void addElement (TestDataElement element)
    {
            elements.add (element);
        }
    }
}
private class DataWriter implements TestResultWriter {
    private DataReader reader;
    private DataWriter (DataReader reader) {
        this.reader = reader;
    }
    public void add (TestDataElement element) {
        reader.addElement   (element);
    }
    public TestResultWriter createChild (String name) {
        return (new DataWriter
            (reader.createChild (name)));
    }
    public TestResultReader   getReader ( ) {
        return (reader);
    }
}
}
public class   TestDataElement {
    int type;
    Object data;
    public TestDataElement (int type, Object data) {
        this.type = type;
        this.data = data;
    }
    public int getType ( )   {return (type);}
    public Object getData ( ) {
        return (data);
    }
}
```

```
                        Code Listing A
public class TestExecutor {
    private Test test;
    private TestData data;
    public TestExecutor (Test test) {
        this.test = test;
        data = new TestData ( );
    }
    public void run ( ) {
        test.run
           (data.getRootWriter( ).createChild(test.getName( )));
    }
}
public class TestSet implements Test {
    private Test [ ]   tests;
    private String name;
    public TestSet (String name, Test  [ ]    tests){
        this.name = name;
        this.tests = tests;
    }
    public void run (TestResultWriter   data) {
        for (int i =o;   i < tests.length;   i++) {
            tests [i].run(data.createChild(tests [i].getName  (
                )));
        }
    }
}
```

Once the restricted access model data structure is generated, a first reader-writer pair (composed of a first reader node and a first writer node) is selected (Step 162). For example, referring to FIG. 4, the first reader-writer pair may be designated to be the child reader 1 (80 of FIG. 4) and the child writer 1 (82 of FIG. 4). Similarly, a second reader-writer pair (composed of a second reader node and a second writer node) is selected (Step 164).

A first data is written to a first data store by the first writer node (Step 166). For example, if the test being conducted is a performance test of a software program, a particular operation included as part of the test may require testing response times for user interactions. Data results (i.e., response times) may be written to a data store as part of the particular operation. Functionality for writing data to the data store via writer nodes is provided, in part, by the following exemplary segments of source code:

```
public void add (TestDataElement   element) {
    reader.addElement   (element);
    ...
public interface TestResultWriter {
    public void add(TestDataElement   element);
    ...
```

Similarly, a second data is written to a second data store by the second writer node (Step 168). Data is read by the first reader node (Step 170). Data is also read by the second reader node via a traversal of the restricted access model data structure using a traversal path that includes a combination of links, such as parent reader-to-child reader links and/or child reader-to-parent reader links (Step 172). For example, the second reader node may access a root reader node via a reader-to-root link and access the first reader node from the root reader node via one or more parent reader-to-child reader links. Once the first reader node is accessed, data is read from the first data store.

However, the first writer node is prevented from writing data to the second data store (Step 174), and the second writer node is prevented from writing data to the first data store (Step 176). For example, in accordance with one or more embodiments of the invention, a class DataWriter (as shown in Code Listing A), which implements a TestResultWriter interface, is an inner class of a container class TestData. The DataWriter class has a private constructor.

Also, a DataReader class exists, which implements a TestResultReader interface, and which is an inner class of the container class TestData. Objects of the DataReader class are instantiated through a private constructor and are maintained as private attributes of objects of the DataWriter class. Furthermore, DataReader methods that write data are private and are not implemented by the TestResultReader interface. However, DataReader methods are accessible to a corresponding writer node. Additionally, both the first and second reader nodes are accessible from the first and second writer nodes, respectively, via a reference from the first and second writer nodes. The reference is a one-way link between writer nodes and reader nodes, in which a writer node of a reader-writer pair is accessible to a reader node of the reader-writer pair, but the writer node is not accessible to the reader node.

Thus, because such methods cannot be accessed except from the corresponding writer node (the writer node is not accessible from other writer or reader nodes because of the one-way link from a writer node to a corresponding reader node), the first writer is prevented from writing data to the second data store. Further, because the data is located within a private inner class, the data is protected from writers other than corresponding writers.

Referring to FIG. 6, data read from the restricted access model data structure is raw data, which may be formatted using the formatter (Step 178). The formatter is able to format the raw data because relationships between data corresponding to individual reader nodes of the restricted access model data structure may be inferred by the formatter. For example, parent-child and sibling relationships between data from different reader nodes may be inferred from a traversal of the restricted access model data structure.

Alternatively, the formatter may be passed a data structure as a parameter that models the restricted access model data structure. Thus, the formatter may read data from a data store, e.g., infer relationships between data, and use the relationships the format the raw data. For example, the formatter may insert markup language tags (e.g., HTML, XML, SGML, etc.) as appropriate for any particular embodiment of the invention, thus generating formatted data. Other document presentation standards may be used, such as TeX, LaTeX, etc. The formatted data is displayed using the formatted data display device (Step 180). The formatted data display device may be, for example, a web server serving up an HTML or XML web page.

Advantages of one or more embodiments of the present invention may include one or more of the following. In one or more embodiments, the invention facilitates protection of data, while allowing access to the data where needed. Thus, malicious client code is restricted to with respect to its ability to corrupt stored data. In one or more embodiments, the invention allows multiple views of stored data within the restricted access data structure while maintaining protection of the data. Those skilled in the art will appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for protecting data of a hierarchical operation, comprising:
    obtaining a restricted access model data structure representing the hierarchical operation, wherein the restricted access model data structure comprises a first writer node and a second writer node;
    preventing the second writer node from writing data to a first data store;
    preventing the first writer node from writing data to a second data store;
    reading data from the first data store by a first reader node, wherein the first reader node and the first writer node are selected from a first reader-writer pair; and
    writing data to the first data store using the first writer node,
    wherein the first writer node and the second writer node are both separate from and external to the first and second data stores,
    wherein the first reader node and the first writer node represent a first operation of the hierarchical operation and a second reader node and the second writer node represent a second operation of the hierarchical operation, wherein said second reader node and said second writer node are selected from a second reader-writer pair,
    wherein preventing the first writer node from writing data to the second data store comprises instantiating a second reader node from an inner class using a private constructor and maintaining the second reader node as a private attribute of the second writer node, and
    wherein preventing the second writer node from writing data to the first data store comprises instantiating a first reader node from an inner class using a private constructor and maintaining the first reader node as a private attribute of the first writer node.

2. The method of claim 1, further comprising:
    reading data from the first data store by a second reader node by traversing the restricted access model data structure from the second reader node to a first reader node.

3. The method of claim 1, further comprising:
    writing data to the second data store using the second writer node.

4. The method of claim 1, further comprising:
    generating a root reader node and a root writer node representing a root operation of the hierarchical operation; accessing the root reader node via a reader-to-root link; and accessing a child reader node of the root reader node via a parent reader-to-child reader link.

5. The method of claim 1, further comprising:
    generating a plurality of raw data by reading data from the first data store; inferring a relationship between each of the plurality of raw data;
    formatting the plurality of raw data into formatted data using the relationship; and
    presenting the formatted data via a display device.

6. The method of claim 5, wherein inferring the relationship comprises traversing the restricted access model data structure.

7. The method of claim 5, wherein the relationship comprises one selected from the group consisting of a parent-child relationship and a sibling relationship.

8. The method of claim 5, wherein formatting the plurality of raw data into formatted data comprises using a tagging scheme.

9. The method of claim 1, wherein preventing the first writer node from writing data to the second data store comprises linking the second writer node and a second reader node using a one-way link.

10. The method of claim 1, wherein preventing the second writer node from writing data to the first data store comprises linking the first writer node and a first reader node using a one-way link.

11. A method for protecting data of a hierarchical operation, comprising:
    obtaining a restricted access model data structure representing the hierarchical operation, wherein the restricted access model data structure comprises a first writer node and a second writer node;
    preventing the second writer node from writing data to a first data store;
    preventing the first writer node from writing data to a second data store, wherein the first writer node and the second writer node are both separate from and external to the first and second data stores;
    reading data from the first data store by a first reader node, wherein the first reader node and the first writer node are selected from a first reader-writer pair;
    reading data from the first data store by a second reader node by traversing the restricted access model data structure from the second reader node to the first reader node, wherein the second reader node and the second writer node are selected from a second reader-writer pair;
    writing data to the first data store using the first writer node;
    writing data to the second data store using the second writer node;
    generating a root reader node and a root writer node representing a root operation of the hierarchical operation;
    accessing the root reader node via a reader-to-root link;
    accessing a child reader node of the root reader node via a parent reader-to-child reader link;
    generating a plurality of raw data by reading data from the first data store;
    inferring a relationship between each of the plurality of raw data;
    formatting the plurality of raw data into formatted data using the relationship; and
    presenting the formatted data via a display device.

12. A computer system for protecting data of a hierarchical operation, comprising:
    a processor;
    a memory;
    a storage device;
    a display device; and
    software instructions stored in the memory for enabling the computer system under control of the processor, to perform:
    obtaining a restricted access model data structure representing the hierarchical operation, wherein the restricted access model data structure comprises a first writer node and a second writer node;
    preventing the second writer node from writing data to a first data store;
    preventing the first writer node from writing data to a second data store, wherein the first writer node and the second writer node are both separate from and external to the first and second data stores;

reading data from the first data store by a first reader node, wherein the first reader node and the first writer node are selected from a first reader-writer pair; and writing data to the first data store using the first writer node, wherein the first reader node and the first writer node represent a first operation of the hierarchical operation and a second reader node and the second writer node represent a second operation of the hierarchical operation, wherein said second reader node and said second writer node are selected from a second reader-writer pair, wherein preventing the first writer node from writing data to the second data store comprises instantiating a second reader node from an inner class using a private constructor and maintaining a second reader node as a private attribute of the second writer node, and wherein preventing the second writer node from writing data to the first data store comprises instantiating a first reader node from an inner class using a private constructor and maintaining a first reader node as a private attribute of the first writer node.

13. The computer system of claim 12, further comprising software instructions to perform:

generating a plurality of raw data by reading data from the first data store;

inferring a relationship between each of the plurality of raw data;

formatting the plurality of raw data into formatted data using the relationship; and presenting the formatted data via the display device.

14. The computer system of claim 12, wherein preventing the first writer node from writing data to the second data store comprises linking the second writer node and a second reader node using a one-way link.

15. The computer system of claim 12, wherein preventing the second writer node from writing data to the first data store comprises linking the first writer node and a first reader node using a one-way link.

16. An apparatus for protecting data of a hierarchical operation, comprising;

means for obtaining a restricted access model data structure representing the hierarchical operation, wherein the restricted access model data structure comprises a first writer node and a second writer node;

means for preventing the second writer node from writing data to a first data store;

means for preventing the first writer node from writing data to a second data store, wherein the first writer node and the second writer node are both separate from and external to the first and second data stores;

means for reading data from the first data store by a first reader node, wherein the first reader node and the first writer node are selected from a first reader-writer pair: and means for writing data to the first data store using the first writer node, wherein the first reader node and the first writer node represent a first operation of the hierarchical operation and a second reader node and the second writer node represent a second operation of the hierarchical operation, wherein said second reader node and said second writer node are selected from a second reader-writer pair, wherein preventing the first writer node from writing data to the second data store comprises instantiating a second reader node from an inner class using a private constructor and maintaining the second reader node as a private attribute of the second writer node, and wherein preventing the second writer node from writing data to the first data store comprises instantiating a first reader node from an inner class using a private constructor and maintaining the first reader node as a private attribute of the first writer node.

* * * * *